United States Patent
Buoni et al.

(10) Patent No.: US 6,537,679 B1
(45) Date of Patent: Mar. 25, 2003

(54) FLUORESCENT ARTICLES OF GLYCOL-MODIFIED POLYETHYLENE TEREPHTHALATE

(75) Inventors: Drew Buoni, Chicago, IL (US); Guang-Xue Wei, Northbrook, IL (US); Kimberly Dockus, Woodridge, IL (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 10/010,699

(22) Filed: Nov. 8, 2001

Related U.S. Application Data

(60) Provisional application No. 60/247,438, filed on Nov. 9, 2000.

(51) Int. Cl.$^7$ .............................................. B32B 27/36
(52) U.S. Cl. ..................................................... 428/480
(58) Field of Search .......................... 428/480; 359/529, 359/530, 531, 532, 534, 535, 536, 537, 538, 542, 546, 547, 551, 552

(56) References Cited

U.S. PATENT DOCUMENTS

| | | | |
|---|---|---|---|
| 3,830,682 A | 8/1974 | Rowland | |
| 4,208,090 A * | 6/1980 | Heenan | 359/514 |
| 4,227,772 A * | 10/1980 | Heenan | 359/531 |
| 4,232,979 A * | 11/1980 | Johnson et al. | 404/16 |
| 5,340,231 A * | 8/1994 | Steere et al. | 404/14 |
| 5,387,458 A | 2/1995 | Pavelka et al. | |
| 5,425,596 A * | 6/1995 | Steere et al. | 404/14 |
| 5,605,761 A | 2/1997 | Burns et al. | |
| 5,672,643 A | 9/1997 | Burns et al. | |
| 5,674,622 A | 10/1997 | Burns et al. | |
| 5,754,337 A | 5/1998 | Burn et al. | |
| 5,920,429 A | 7/1999 | Burns et al. | |
| 5,988,821 A * | 11/1999 | Tanaka et al. | 359/536 |
| 6,048,069 A * | 4/2000 | Nagaoka et al. | 359/529 |
| 6,110,566 A | 8/2000 | White et al. | |
| 6,303,058 B1 * | 10/2001 | Kelley et al. | 264/1.38 |
| 6,334,734 B1 * | 1/2002 | Attar | 404/16 |

FOREIGN PATENT DOCUMENTS

| | | |
|---|---|---|
| EP | 0 489 561 A1 * | 6/1992 |
| JP | 2-16042 | 1/1990 |
| WO | WO 00/73590 A1 * | 12/2000 |

* cited by examiner

*Primary Examiner*—Vivian Chen
(74) *Attorney, Agent, or Firm*—Jones, Day, Reavis & Pogue

(57) ABSTRACT

A fluorescent retroreflective article comprising a polymer resin comprising poly(1,4-cyclohexanedimethanol-co-ethylene terephthalate) and a fluorescent dye selected from the group consisting of perylene imide and perylene ester dyes, thioxanthene dyes, benzoxanthene dyes, and benzothiazine dyes exhibits good color and fluorescent durability.

Said PETG fluorescent resin matrix can be used to enhance daytime visibility of a roadway marker. Such a pavement marker comprises a base member comprising a structure of a light-transmissible fluorescent material, the structure having a top surface and a front edge surface, the base member being configured to provide an air cap beneath the structure. Light incident on the top surface of the fluorescent structure is directed through said structure and emitted through said front edge surface to provide a signal to a driver of an oncoming vehicle.

8 Claims, No Drawings

FLUORESCENT ARTICLES OF GLYCOL-MODIFIED POLYETHYLENE TEREPHTHALATE

This application claims the benefit of provisional application Ser. No. 60/247,438, filed Nov. 9, 2000.

FIELD OF THE INVENTION

The present invention relates generally to fluorescent polymeric articles that are light stable and that use a polymer matrix containing glycol-modified polyethylene terephthalate. The invention also relates to a method of making such light stable fluorescent articles.

BACKGROUND OF THE INVENTION

Retroreflective sheeting is widely used for traffic and roadway safety signs. Such sheeting is typically provided as a polymeric monolayer or multilayer sheeting material having thousands of retroreflective elements, such as microprismatic corner cubes or glass microspheres that reflect incident light. It is well known to incorporate one or more fluorescent dyes into a retroreflective sheeting in order to enhance the visibility of articles such as road signs manufactured from such sheeting material. Fluorescent colors enhance visual contrast, which makes fluorescent colored materials more conspicuous than nonfluorescent materials. Unfortunately, most fluorescent colorants have poor ultraviolet light stability. In some cases, fading of fluorescent sheeting due to ultraviolet light exposure can occur within six months. The loss of fluorescence caused by ultraviolet light exposure dramatically shortens the useful life of fluorescent traffic and roadway signs. Accordingly, there is need in the art to stabilize fluorescent colorants in plastics and to find a means to reduce the fading of fluorescent dyes in order to provide articles such as retroreflective road signs that can remain in service for significantly longer periods.

To enhance the outdoor durability of fluorescent retroreflective sheeting, an ultraviolet light screening layer is often used to protect the fluorescent polymeric matrix layer from the effects of ultraviolet radiation. Traditionally, the U.V. light screening layer is made by incorporating U.V. light absorbing compounds into a transparent polymer matrix. Japan Kokai No. 2-16042, Application No. 63-165914 (Koshiji et al.) and U.S. Pat. No. 5,387,458 (Pavelka et al.) each disclose fluorescent articles consisting of an ultraviolet screen layer disposed in front of a fluorescent layer. According to these references, the screening layer contains substantial amounts of ultraviolet light absorbing compounds, which absorb a defined range of U.V. light (wavelength from about 290 to about 400 nm).

Such prior art multilayer structures in which a screening layer containing U.V. light absorbent additives is disposed in front of a layer containing a fluorescent dye can give rise to several difficulties. One problem is that the U.V. light absorbent additives incorporated into the U.V. light screening layer may leach out with time, because most U.V. light absorbing compounds are relatively small molecules and the U.V. light screening layer is typically quite thin. As a result of this phenomenon, the screening layer may lose its protective function, and the fluorescent colorants in the fluorescent layer will quickly fade and lose their fluorescence when exposed to ultraviolet light. A further problem with the U.V. light absorbent additive-treated screening layers is that U.V. light absorbing compounds present therein can diffuse or migrate into the fluorescent layer. If the U.V. light absorbing compound is not carefully selected, this diffusion can actually accelerate the fading of the fluorescent colorant even though the diffused compound is one that absorbs U.V. light. The problem of additive migration requires that a U.V. light absorbing additive incorporated into a screening layer be carefully matched to the fluorescent colorant so as to minimize any tendency of the migrating U.V. light absorber to affect the color and fluorescence of the colorant. The implication that one may randomly select any U.V. absorber capable of blocking most of U.V. light below about 400 nm wavelength (see, e.g., Japan Kokai No. 2-16042, Application No. 63-165914 (Koshiji et al.) and U.S. Pat. No. 5,387,458 (Pavelka et al)) fails to take into account the potential interaction between the U.V. absorber in the screening layer, and the fluorescent dye(s) present in the colored layer.

The use of a multi-layer polymeric structure also presents difficulties in manufacturing. Multiple films must be extruded or castand the individual films laminated together, resulting in a more expensive and more time-consuming process. Moreover, technical problems can arise. The different resins in a multi-layer structure must be compatible with one another, and must be processable within the same temperature range. Where the multi-layer article is a retroreflective sheeting structure and the refractive indices of contacting layers are different, the interface between the layers must be delicately controlled to optimize the optical characteristics of the resultant articles.

Other references disclose fluorescent sheeting articles which do not necessarily incorporate a screening layer and which have particular combinations of polymers and fluorescent dyes. Such references include U.S. Pat. No. 3,830,682 (Rowland), U.S. Pat. No. 5,605,761 (Burns et al.), U.S. Pat. No. 5,674,622 (Burns et al.), U.S. Pat. No. 5,672,643 (Burns et al.), U.S. Pat. No. 5,754,337 (Burns et al.), U.S. Pat. No. 5,920,429 (Burns et al.), and U.S. Pat. No. 6,110,566 (White et al.). Of these, only U.S. Pat. Nos. 5,605,761 and 6,110,566 present any data relating to fluorescent durability. This data indicates that the fluorescent durability of the structures disclosed is less than optimum. In particular, U.S. Pat. No. 5,605,761 discloses fluorescent articles comprising polycarbonate (PC), fluorescent dye, and a hindered amine light stabilizer. According to the reference, the combination of polycarbonate, fluorescent dye and hindered amine light stabilizer containing a 2,2,6,6-tetramethyl piperidine compound could extend the fluorescent lifetime of the resultant articles. U.S. Pat. No. 6,110,566 teaches that the combination of a fluorescent thioxanthene dye and a hindered amine light stabilizer in a solventless polyvinyl chloride (PVC) polymeric matrix will substantially enhance the light stability of the fluorescent colors in the PVC system. Neither of these patents, however, discloses structures which extend the life of the fluorescent color sufficiently for long-term use. With either system, within approximately 400 hours of accelerated artificial weathering, the data indicates that the fluorescent color has substantially shifted and the material begins to take on a faded appearance. This shift is indicated by the large loss, i.e. less than or equal to 50% dye retention, of the fluorescent dye from the either the PVC system or the PC system.

Based on the problems described above, there is a strong need in the art for fluorescent thermoplastic articles that exhibit improved color and/or fluorescent stabilization against ultraviolet radiation without requiring the placement of a separate ultraviolet light screening and/or absorbent layer over the article. In view of the foregoing, one object of the present invention is to provide a thermoplastic article in which a fluorescent dye is stabilized against ultraviolet light degradation in the absence of a separate ultraviolet light protectant layer.

Another object of the invention is to provide stabilized fluorescent retroreflective sheeting suitable for fabrication into outdoor weatherable products such as road signs, which are less susceptible to ultraviolet light weathering and the rapid loss of fluorescence resulting therefrom.

SUMMARY OF THE INVENTION

The present invention provides articles that exhibit unexpectedly durable fluorescence even after extended ultraviolet light exposure. In accordance with the invention, such articles comprise a polymeric matrix comprising poly(1,4-cyclohexanedimethanol-co-ethylene terephthalate), commonly referred to as glycol-modified polyethylene terephthalate, or PETG, and a fluorescent dye selected from the perylene imide and perylene ester dyes, thioxanthene dyes, benzoxanthene dyes, and benzothiazine dyes. The fluorescent dye must be thoroughly incorporated into the PETG resin system, preferably under conditions which create high shear but at temperatures that are not undesirably high. Ultraviolet light stabilization additives such as ultraviolet light absorbers (UVAs) or hindered amine light stabilizers (HALS) can also enhance the ultraviolet light stability of the resulting article. We have found that by careful selection of the fluorescent dyes and ultraviolet light stabilization additives, and by careful control of the process parameters used to disperse the fluorescent dye within the polymeric matrix, the fluorescent durability of the resultant article can be significantly enhanced beyond that which would have been expected in view of the prior art.

The invention is further directed to a retroreflective sheeting material comprising the polymeric article described above and having a plurality of retroreflective elements. Such retroreflective sheeting materials find particular utility when used to fabricate retroreflective road signs.

The fluorescent PETG articles of the instant invention exhibit enhanced fluorescent and color durability, yet without requiring the use of known UV light screening layers such as were used in the prior art. Because the UV light screening layer can be eliminated, there are no difficulties with regard to leaching out of UV light absorbers or migration of UV light absorbers from the screening layer which can actually cause accelerated fading of fluorescent colorants in a polymeric matrix. To those skilled in the art, it is evident that a PETG resin system itself is not extremely durable. If an extremely durable fluorescent PETG article is desired, an U.V. screening layer can be used to protect the PETG resin.

DETAILED DESCRIPTION OF THE INVENTION

In accordance with the invention a fluorescent article comprises a polymeric matrix comprising poly(1,4-cyclohexanedimethanol-co-ethylene terephthalate) commonly referred to glycol-modified polyethylene terephthalate (or PETG), in which one or more fluorescent colorants and optional ultraviolet light stabilizing additives have been thoroughly dispersed. One class of suitable PETG resins is that which includes from about 80–95% by weight of a generally rigid polyethylene cyclohexanedimethylene terephthalate in which preferably from 2 to 20 molar parts of ethylene units are present per 1 molar part of cyclohexanedimethylene units. Such materials are generally described in U.S. Pat. No. 4,225,688 (Dennehey et al.) incorporated herein by reference in its entirety. PETG resins particularly suitable for use in the instant invention are Eastar GN-071 PETG, Eastar 6763 PETG, and Eastar UVSG PETG, all available from Eastman Chemical Company, Kingsport, Tenn. Other glycol-modified polyethylene terephthalates that might be suitable for use in the fluorescent articles of the instant invention include those disclosed in U.S. Pat. No. 5,955,565 (Morris et al.) also incorporated herein by reference in its entirety. Alloys of PETG and other resins also may be suitable.

We have discovered that four families of fluorescent dyes are particularly suitable for use in a PETG polymer resin system. These dye families include the perylene imide and perylene ester dyes such as Lumogen F Yellow 083, available from BASF Corporation (Rensselaer, N.Y.); thioxanthene dyes such as Solvent Yellow 98, available as Hostasol 3G from Clariant Corporation (Coventry, R.I.); benzoxanthene dyes such as Lumofast Yellow 3G, available from Day-Glo Color Corp (Cleveland, Ohio), and benzothiazine dyes such as Yellow 979, also known as Huron Yellow D-417, available from Day-Glo.

We have discovered that the conditions under which the fluorescent dye is incorporated into the PETG polymeric resin matrix significantly affect the fluorescence and color durability of the resultant PETG fluorescent articles. The fluorescent dye should be dispersed as thoroughly and evenly as possible within the PETG polymeric resin matrix. Furthermore, the temperature during the dispersion process must not be too high, yet significant shear must be imparted to the dye/PETG resin mixture in order to achieve adequate mixing of the dye into the resin matrix in accordance with the invention. On a laboratory scale, we have found that a Brabender prep-type mixer is suitable for preparing samples of fluorescent resin film in accordance with the instant invention. By comparison, a laboratory scale single-screw extruder run at traditional settings for zone and die temperatures, screw speed and take-up speed cannot provide the appropriate dwell time and shear required for processing fluorescent PETG articles of the instant invention. Though the fluorescent dye visually appears fully developed in film samples prepared using either method, the durability of films prepared using the prep-type mixer exceeds the durability of films prepared on a single-screw extruder. Not wishing to be bound to any particular theory, it is believed that the shear force, dwell time and processing temperature are important factors in producing extremely durable fluorescent PETG articles. It is believed that other laboratory scale mixing systems which provide high shear force and enough dwell time but which do not result in unduly high temperatures for prolonged periods of time also may be suitable for manufacturing films of the instant invention. Such mixing devices may include two-roll mills and twin-screw extruders. It is believed that a single-screw extruder run at nontraditional conditions might also produce fluorescent PETG materials with extreme durability if the temperature and screw speed are dropped in order to increase the shear force and dwell time. For production scale manufacturing, the shear force, dwell time, and processing temperature must be controlled in order to fully develop the fluorescent color in the PETG polymeric resin matrix in such a way as to produce excellent durability.

Embodiments of the invention are described in the following examples. In these examples, each sample was placed into a Xenon Arc accelerated weathering unit and color measurements were routinely measured. Color measurements were taken on a Hunter Lab LS6000 instrument using a D65 light source, 2° observer, and 0/45 geometric configuration. To determine the extent of fading and color shifts, the CIE $\Delta E^*$ color difference factor was calculated to compare color measurements after accelerated weathering exposure with initial measurements made prior to weathering. A small value of the CIE ΔE* color difference factor indicates small differences in color. A value of about 2 or 3 is barely detectable to the human eye. The test methodology used for the Xenon Arc weathering is outlined in ASTM G26-90, Section 1.3.1. Borosilicate inner and outer filters were used and the irradiance level was set to 0.35 W/m² at 340 nm.

EXAMPLE 1

PETG resin sold under the name Eastar GN-071 resin by Eastman Chemical Company was compounded using a C. W. Brabender Plasti-Corder Prep-Mixer (manufactured by C. W. Brabender Instruments, Inc. of Hackensack, N.J.) and then converted into film samples of approximately 6 mils using a heated platen press. The mixing temperature was set to approximately 230° C. and the mixing speed of the unit was initially set to approximately 25 rpm. After the PETG resin had obtained a molten state, the fluorescent dye was slowly incorporated in accordance with the type and amounts set forth in Table 1 below. After all the dye had been added to the sample, the speed was increased to approximately 100 rpm and the formulation was allowed to process for approximately an additional six minutes.

TABLE 1

Accelerated Weathering Results of Fluorescent PETG for Various Fluorescent Dyes
Films Prepared by Prep-type Mixer Compounding

| | | | CIE ΔE* color difference after indicated period of Xenon exposure (Xenon hours) | | | | |
|---|---|---|---|---|---|---|---|
| Sample | Fluorescent Dye | Dye Loading | 100 | 500 | 1000 | 1500 | 2000 |
| 1-1 | BASF Lumogen Yellow F 083 | 0.2% | 2.79 | 2.21 | 11.97 | 7.90 | |
| 1-2 | BASF Lumogen Yellow F 083 | 0.25 pphr | — | 3.68 | 10.02 | 13.68 | 12.02 |
| 1-3 | Clariant Hostasol 3G | 0.45 pphr | 3.50 | 4.60 | 10.03 | 7.86 | 11.10 |
| 1-4 | Day-Glo Lumofast Yellow 3G | 1.00 pphr | 12.51 | 11.89 | 11.34 | 10.83 | 8.61 |
| 1-5 | Day-Glo Yellow 979 | 0.08 pphr | 3.18 | 9.87 | 20.02 | 12.76 | 31.60 |

Each of the above samples demonstrates that improved color stability of fluorescent dyes can be obtained when the dyes are properly incorporated into a PETG resin system such as under the conditions described above. The values of ΔE* are significantly less than the ΔE* values reported in U.S. Pat. No. 5,605,761 for samples having no screening layer and no ultraviolet light absorbers or hindered amine light stabilizers. In fact, after 1500 hours of exposure, the above ΔE* values are significantly lower than even those samples reported in prior art U.S. Pat. No. 5,605,761 that incorporate HALS. It should be noted that the initial shift associated with the benzoxanthene dye Lumofast 3G is a characteristic of the dye itself and not of the matrix into which it is incorporated or the method by which it is incorporated. This color shift occurs within the first 50 hours of Xenon Arc weathering exposure. After this initial shift, however, the fluorescent color is remarkably stable in the PETG resin system. If this initial color shift is deemed undesirable for a particular use, the color shift may be reduced or minimized by techniques know in the art.

Comparative Example 2

In the four samples of comparative Example 2, two samples were prepared with 6763 PETG resin, and two samples were prepared with UVSG PETG, both available from Eastman Chemical. The two samples using 6763 PETG resin were loaded with 0.20 parts per hundred resin of perylene imide Lumogen F Yellow 083, available from BASF. The two samples using UVSG PETG resin were loaded with 0.45% of thioxanthene Hostasol 3G, available from Clariant. One sample of each resin type was prepared with a 1¼ inch KL-series Kilion single screw extruder fitted with a 24:1 Feed Screw with a Maddock-mixer. The following temperature settings were used: Zone 1=425° F. (218° C.), Zone 2=435° F. (224° C.), Zone 3=445° F. (229° C.), Adapter Temp=455° F. (235° C.). Die Temp=445° F. (229° C.). The screw speed was set to approximately 31 rpm, and the film take-off speed was set at 12 fpm to produce a film of approximately 6 mil thickness. The other sample of each resin type was prepared with a Brabender Prep-Mixer using the procedure described in Example 1. The 6763 PETG resin was processed at a temperature at 230° C. while the UVSG PETG resin is optimally processed at 200° C.
Table 2

Comparison of Dispersion Methods

| | | | CIE ΔE* color difference after indicated period of Xenon exposure (Xenon hours) | | | |
|---|---|---|---|---|---|---|
| Sample | Resin System | Dispersion Method | 100 | 500 | 1000 | 1500 |
| 2-1 | 6763 | Brabender | 2.17 | 0.85 | 3.74 | |
| 2-2 | 6763 | Single-Screw Extrusion | 2.35 | 14.22 | 24.38 | 40.86 |
| 2-3 | UVSG | Brabender | 0.95 | 1.34 | 1.67 | |
| 2-4 | UVSG | Single-Screw Extrusion | 2.63 | 5.45 | 6.46 | — |

For each resin system, the sample prepared with the single screw extruder shows a larger color shift than the sample prepared with the Brabender mixer. As discussed previously, the film prepared by either method visually appears identical with respect to the dispersion of the fluorescent dye. Without wishing to be bound by any theory, it is believed that the superior results obtained with samples prepared in the Brabender mixer result from the differences in dwell time, shear, and temperature between the two dispersion methods. To produce durable fluorescent PETG film, the dye incorporation technique is extremely important therefore significant care must be taken during each phase of production to control the dwell time shear force and temperature.

EXAMPLE 3

Samples were prepared as in Example 1 in a Brabender mixer using the resins and dye loading indicated. For the samples made with GN-071 PETG, the dye used was BASF perylene ester Lumogen F Yellow 083. For samples using UVSG PETG, the dye used was Clariant thioxanthene Hostasol 3G. Other than the processing time and temperature after the addition of fluorescent dye, the process methodology remained the same.

TABLE 3

Comparison of Variable Dispersion Time and Temperature

| Sample | Dye Resin | Loading | Brabender Temp., °C. | Mixing time | CIE ΔE* color difference after indicated period of Xenon exposure (Xenon hours) | | | |
|---|---|---|---|---|---|---|---|---|
| | | | | | 100 | 500 | 1000 | 1500 |
| 3-1 | GN-071 | 0.25% | 200 | 6 | 4.66 | 2.14 | 5.28 | 5.42 |
| 3-2* | GN-071 | 0.25% | 230 | 6 | N/A | 3.68 | 10.02 | 13.68 |
| 3-3 | GN-071 | 0.25% | 230 | 12 | 3.74 | 1.78 | 8.42 | 7.48 |
| 3-4 | GN-071 | 0.20 pphr | 200 | 6 | 3.51 | 2.48 | 3.08 | N/A |
| 3-5 | UVSG | 0.45% | 230 | 6 | 0.32 | 1.48 | 7.53 | N/A |
| 3-6 | UVSG | 0.45% | 230 | 12 | 1.06 | 1.13 | 2.94 | 7.78 |
| 3-7* | UVSG | 0.45% | 200 | 6 | 0.95 | 1.34 | 1.67 | N/A |

*Same sample as 1–2 in Table 1.
*Same sample as 2–3 in Table 2.

A comparison of sample 3-2 with either 3-1, 3-3, or 3-4 and sample 3-5 with either 3-6 or 3-7 suggests that improved color stability can be achieved with a lower processing temperature which increase shear force. Further comparison of these samples suggests that improved color stability can be achieved with a longer processing time at a uniform temperature.

This data suggests shear force, dwell time and temperature will affect the color and fluorescence stability of the resulting film samples. Without being bound by any theory, we believe that a lower temperature is desirable provided that the resin will still be flowing because more shear is created during the dispersion process with lower temperatures. This color and fluorescence stability data is surprising because upon visual inspection of each film sample in each of these samples, the fluorescent dye appears to be fully dispersed and the film samples appear clean. One skilled in the art would not have anticipated a difference in weatherability.

The amount of fluorescent dye used in the fluorescent layer is dependent upon the type of dye, typically in the range of about 0.05 to about 1.5 percent, preferably in the range of 0.08 to 1.0 percent based on the total weight of the fluorescent layer. In some cases, the loading of fluorescent dyes depends on the gauge of the fluorescent layer and the specific tint desired. The loading level can easily be determined in accordance with the skill in the art. Further in addition to the fluorescent dyes, non-fluorescent colorants may also be used to adjust the color of the final product.

The results above illustrate that proper selection of the fluorescent dye used and proper techniques for compounding the dye into the PETG resin matrix can produce unexpectedly good fluorescence and color durability. It is known, however, that even while the fluorescence and color exhibit good durability over extended Xenon arc exposure as well as outdoor exposure, the PETG matrix itself can undergo degradation.

To protect the PETG matrix from such degradation, the well known ultraviolet light absorbers (UVA's) and hindered amine light stabilizers (HALS) can be used in either the fluorescent layer itself or in an ultra-violet light screening layer, although the present invention makes it possible to substantially reduce or eliminate such additives in the fluorescent layer and in the U.V. light screening layer. Those skilled in the art can determine the appropriate ultraviolet light stabilization package for the PETG resin system. However caution must be used when selecting the UVA and/or HALS so as not to decrease the durability of the overall fluorescent PETG article.

The PETG fluorescent resin systems of the instant invention can be used in a wide variety of articles for which good fluorescent and color durability are desirable. One such type of article is sheeting for use in road signs, and in particular retroreflective road signs.

In a retroreflective sheeting material of the instant invention, a plurality of microprismatic retroreflective elements are formed directly onto a surface of one layer of the sheeting material in a known manner. For example, Pricone et al., U.S. Pat. No. 4,601,861 discloses an improved method and apparatus for continuously embossing a repeating pattern of precise detail, in particular, cube-corner type retroreflector elements, on one surface of a single sheet or on one surface of a laminate of transparent thermoplastic materials, to form retroreflective sheeting. Pricone et al. discloses a continuous embossing tool in the form of a flexible thin metal belt or cylinder having on its outer surface an embossing pattern which is the reverse of the precision optical pattern to be formed. The embossing tool is continuously moved at a predetermined speed along a closed course through a heating station where the temperature of a portion of the embossing tool is raised above the glass transition temperature of the sheeting or laminate, and a cooling station where the heated portion of the embossing tool is cooled, while in a relatively planar condition, to below that glass transition temperature. The sheeting is continuously moved at the predetermined speed from a supply thereof into engagement with the embossing pattern on the tool and is pressed thereagainst continuously at a plurality of pressure points sequentially spaced along the heating station, with the one surface of the sheeting confronting and engaging the embossing pattern until the sheeting is raised above its glass transition temperature and conforms to the embossing pattern on the one face. The sheeting is maintained in engagement with the tool until the tool passes through the cooling station and the sheeting is lowered below its glass transition temperature and the pattern solidifies. The sheeting thereafter is stripped from the tool. Further details of the foregoing methodology are described in Pricone et al. which is incorporated herein by reference.

When in the form of sheeting material, the PETG fluorescent film layer may have cube corner elements formed directly thereon, or it may be laminated to another transparent sheeting material with cube corner elements on its opposite surface. In addition to being using with microprismatic sheeting, the fluorescent article of the instant invention may also be incorporated into an enclosed lens retroreflective sheeting article (U.S. Pat. No. 2,407,680, Palmquist) or an encapsulated lens retroreflected article (U.S. Pat. No. 3,190,178, McKenzie), both of which are well-known in the retroreflective sheeting industry. The fluorescent articles of the instant invention can also be provided with a transparent screening layer or other overlaminate film selected to have properties desirable for the front surface of a retroreflective sign, such as dew resistance or graffiti resistance, which properties may not be optimum in a PETG-containing resin. Other variations will be apparent to those skilled in the arts of retroreflective sheeting and fluorescent thermoplastic articles.

We claim:

1. A fluorescent retroreflective article comprising at least one film layer, said at least one film layer comprising
   a. a polymer matrix containing poly(1,4-cyclohexanedimethanol-co-ethylene terephthalate), and
   b. a fluorescent dye selected from the group consisting of perylene imide and perylene ester dyes, thioxanthene dyes, benzoxanthene dyes, and benzothiazine dyes.

2. The article of claim 1 wherein said at least one film layer has a plurality of retroreflective elements disposed on a surface thereof.

3. The article of claim 1 comprising a second layer, said second layer having a plurality of retroreflective elements on a surface thereof.

4. The article of claim 1 wherein said fluorescent dye is present in an amount of up to about 2% by weight of the polymer matrix.

5. A method of making a fluorescent retroreflective article comprising
   a. combining an amount of a polymer matrix containing poly(1,4-cyclohexanedimethanol-co-ethylene terephthalate) with a fluorescent dye selected from the group consisting of perylene imide and perylene ester dyes, thioxanthene dyes, benzoxanthene dyes, and benzothiazine dyes,
   b. using said polymer matrix with dispersed fluorescent dye to manufacture a retroreflective article.

6. The method of claim 5 wherein said article is a film layer and said manufacture is done by extrusion.

7. The method of claim 5 wherein said fluorescent dye is present in an amount of up to about 2% by weight of the polymer matrix.

8. A pavement marker for providing a signal on an associated roadway surface visible to a driver of an oncoming vehicle, said marker comprising a base member, said base member comprising a structure of a light-transmissible fluorescent resin material, said fluorescent resin material comprising poly(1,4-cyclohexanedimethanol-co-ethylene terephthalate); and a fluorescent dye selected from the group consisting of perylene imide and perylene ester dyes, thioxanthene dyes, benzoxanthene dyes, and benzothiazine dyes, said structure having a top surface and a front edge surface, said base member being configured to provide an air gap beneath said structure of light-transmissible fluorescent material, whereby light received by said top surface is directed through said structure and emitted through said front edge surface to provide a signal to a driver of an oncoming vehicle.

* * * * *